United States Patent
Hammerle

(10) Patent No.: US 10,569,623 B2
(45) Date of Patent: Feb. 25, 2020

(54) VEHICLE TOP ASSEMBLY

(71) Applicant: Theodore J. Hammerle, Ankeny, IA (US)

(72) Inventor: Theodore J. Hammerle, Ankeny, IA (US)

(73) Assignee: Theodore Hammerle, Ankeny, IA (US)

( * ) Notice: Subject to any disclaimer, the term of this patent is extended or adjusted under 35 U.S.C. 154(b) by 0 days.

(21) Appl. No.: 16/102,168

(22) Filed: Aug. 13, 2018

(65) Prior Publication Data

US 2019/0039443 A1 Feb. 7, 2019

Related U.S. Application Data

(63) Continuation-in-part of application No. 15/616,043, filed on Jun. 7, 2017, now Pat. No. 10,046,625.

(60) Provisional application No. 62/349,206, filed on Jun. 13, 2016.

(51) Int. Cl.
| | |
|---|---|
| *B60J 7/08* | (2006.01) |
| *B60J 7/00* | (2006.01) |
| *B60J 7/06* | (2006.01) |
| *B60J 3/02* | (2006.01) |
| *B60J 11/02* | (2006.01) |
| *B60J 7/185* | (2006.01) |

(52) U.S. Cl.
CPC ............ *B60J 7/0015* (2013.01); *B60J 7/067* (2013.01); *B60J 7/085* (2013.01); *B60J 7/1858* (2013.01); *B60J 11/02* (2013.01)

(58) Field of Classification Search
CPC ... B60J 7/067; B60J 7/068; B60J 7/085; B60J 7/0015; B60J 7/1858; B60J 7/206; B60J 11/02; B60J 7/06; B60J 7/02; B60J 7/0084
USPC ....................................................... 296/219
See application file for complete search history.

(56) References Cited

U.S. PATENT DOCUMENTS

| | | | | |
|---|---|---|---|---|
| 1,738,060 A | * | 12/1929 | Barnes ...................... | B60J 7/061 296/219 |
| 4,762,358 A | * | 8/1988 | Levosky ................ | B60J 1/2063 160/323.1 |
| 6,851,739 B2 | * | 2/2005 | Morley ...................... | B60J 1/08 280/756 |

FOREIGN PATENT DOCUMENTS

GB          203360          * 9/1923

* cited by examiner

*Primary Examiner* — Dennis H Pedder
(74) *Attorney, Agent, or Firm* — Zarley Law Firm, PLC

(57) ABSTRACT

A vehicle top assembly having a housing and a pair of rails that are perpendicular to and extend away from the housing. A roller is rotatably mounted within the housing. A layer of material is attached to the roller and has one or more locking members attached to a side edge.

7 Claims, 7 Drawing Sheets

VEHICLE TOP ASSEMBLY

CROSS REFERENCE TO RELATED APPLICATION

This application is a continuation-in-part of U.S. Ser. No. 15/616,043 filed Jun. 7, 2017, which claims the benefit of the priority of U.S. Provisional Application Ser. No. 62/349,206 filed Jun. 13, 2016, the contents of these application are hereby incorporated by reference in their entirety.

BACKGROUND OF THE INVENTION

This invention is directed to a top or cover for a convertible vehicle, and more particularly, a removable cover for a Jeep or the like.

Covers for convertible vehicles are well-known in the art for providing shade and protection from the elements, such as rain. Current covers are complex having many parts, expensive to produce, and are difficult to attach and remove from a vehicle. As a result, a need exists for a device that is simple in construction and has fewer parts. Also needed is a device that is inexpensive to produce. Finally, a device is needed that is easy to attach, operate and remove.

SUMMARY OF THE INVENTION

A vehicle cover assembly having a transverse housing and a pair of rails that is attached to the roll bar of a convertible vehicle. A roller is rotatably mounted within the housing that is spring loaded or operated with a crank.

A layer of material is attached to the roller at a first end. One or more locking members are attached to a side edge(s) of the layer of material. The pair of rails have one or more locking slots that have a locking catch of a locking section that selectively engage and hold the locking members in place.

DETAILED DESCRIPTION OF THE PREFERRED EMBODIMENT

Figure 1:
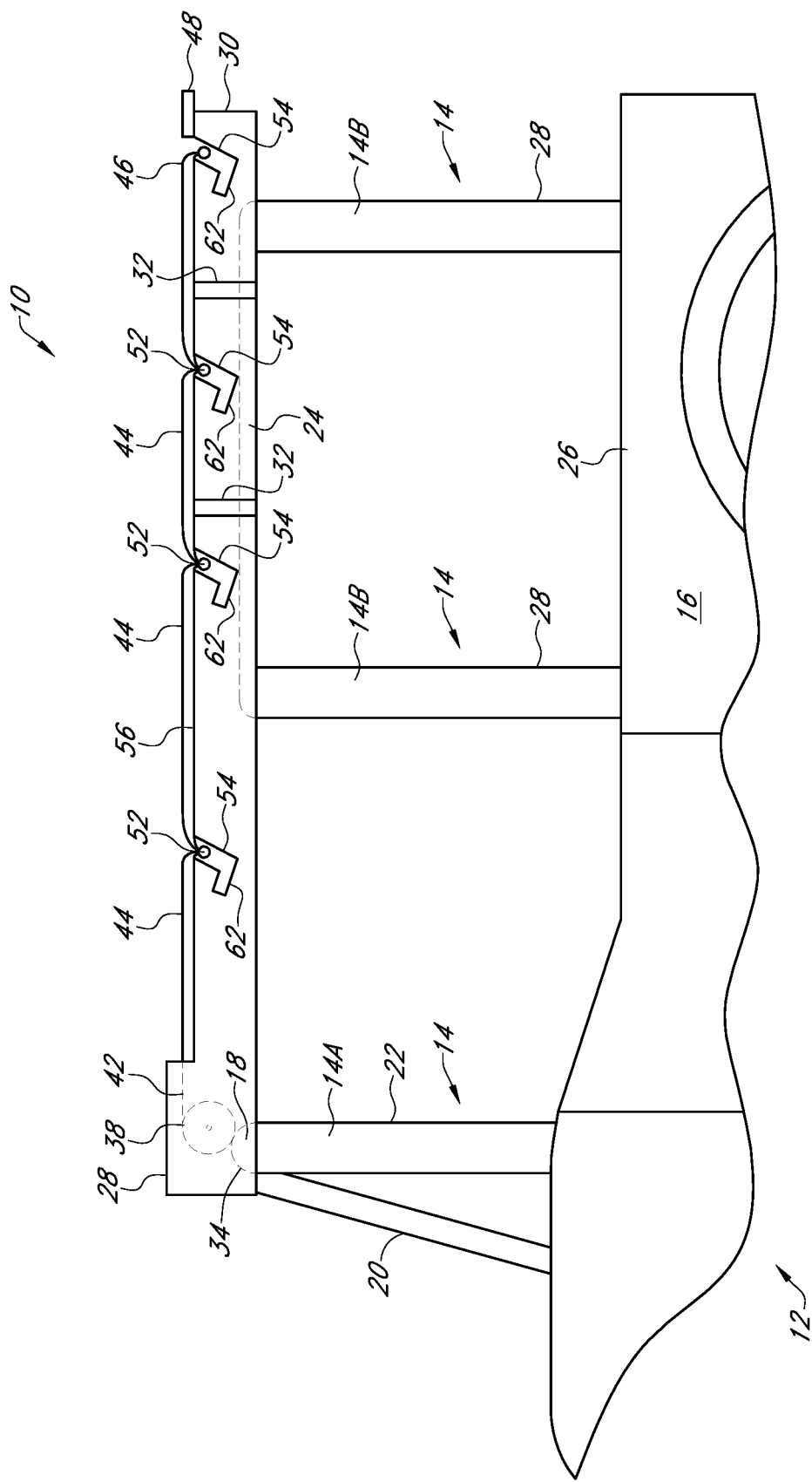
FIG. 1 is a side sectional view of a vehicle cover assembly.
Figure 2:
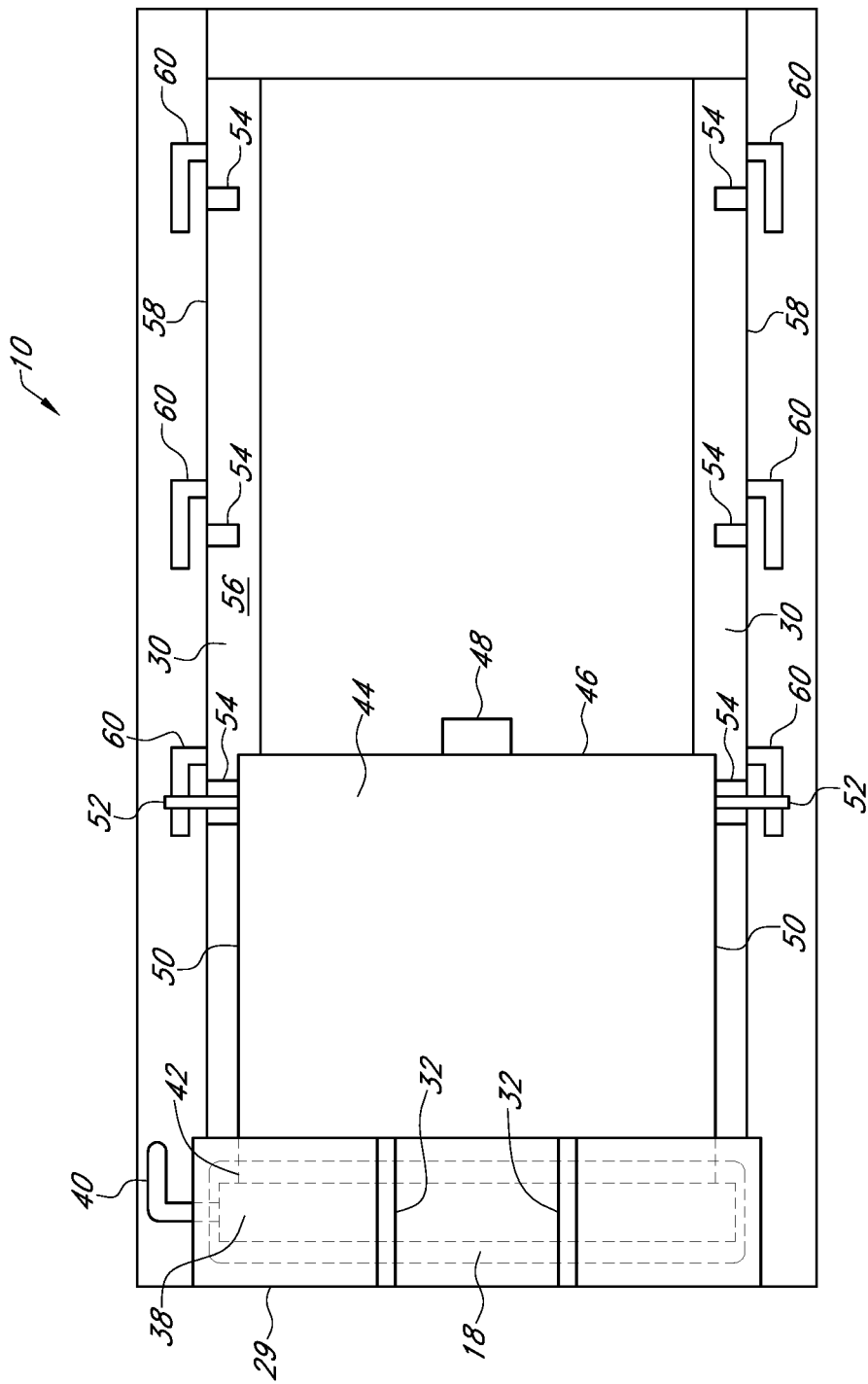
FIG. 2 is a top plan view of a vehicle cover assembly
Figure 3:
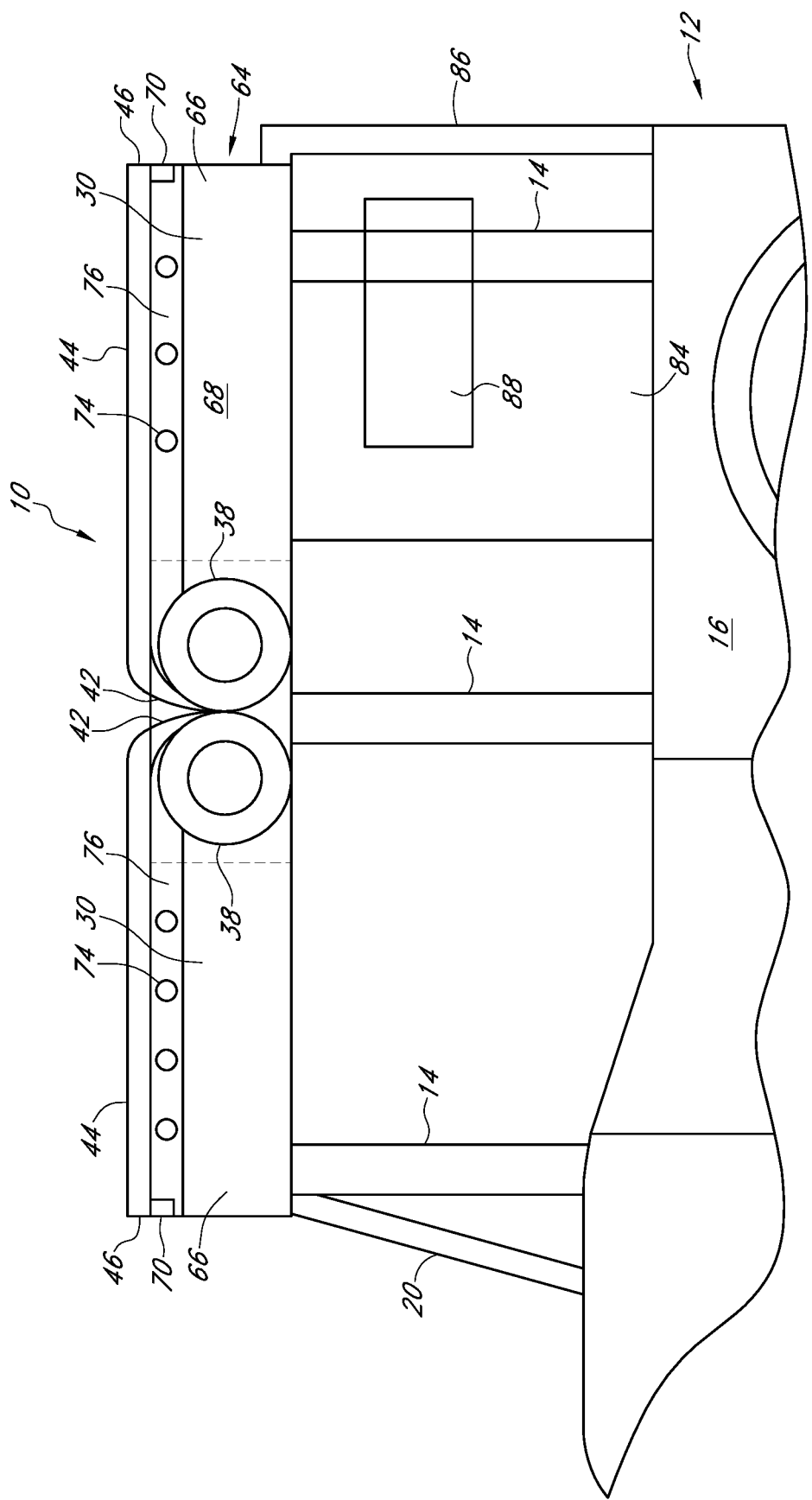
FIG. 3 is a side sectional view of a vehicle top cover assembly.
Figure 4:
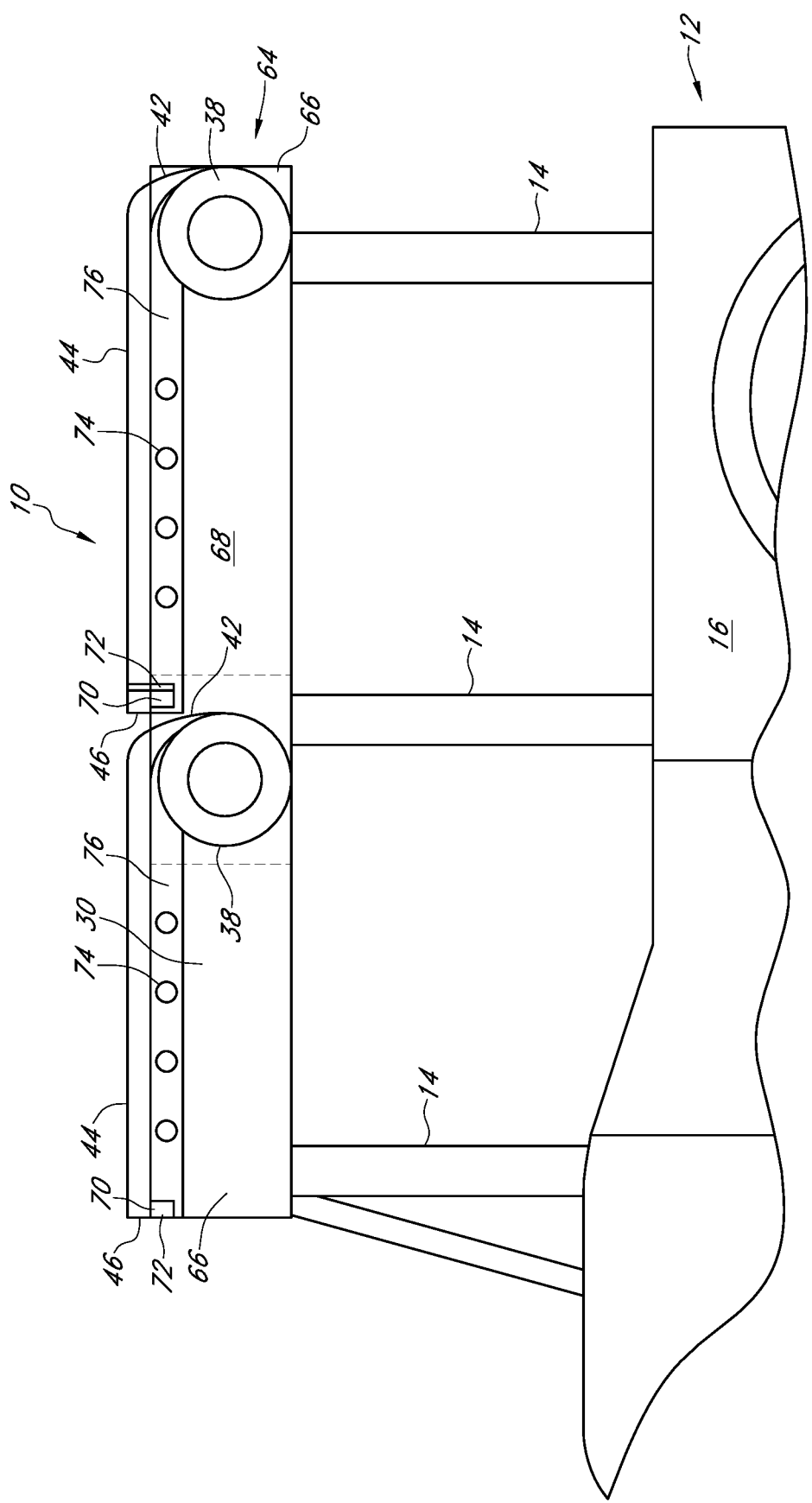
FIG. 4 is a side sectional view of a vehicle top cover assembly.
Figure 5:
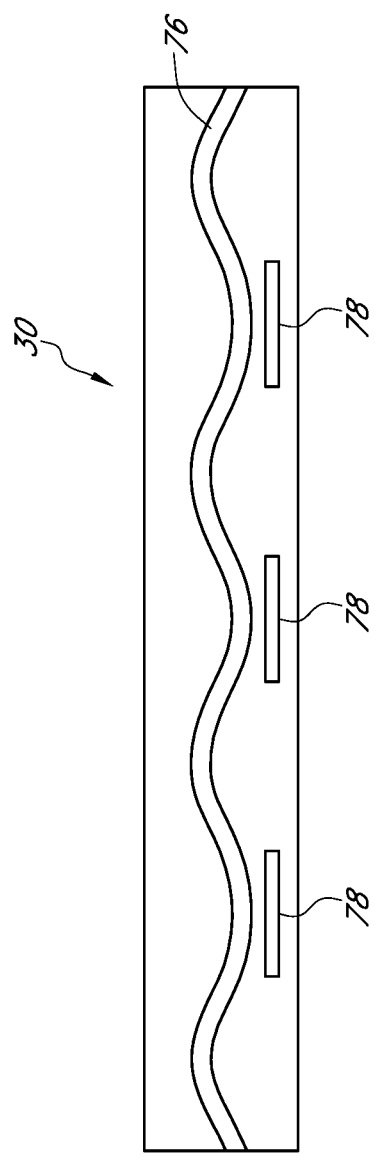
FIG. 5 is a side sectional view of a side rail of a vehicle top cover assembly.
Figure 6:
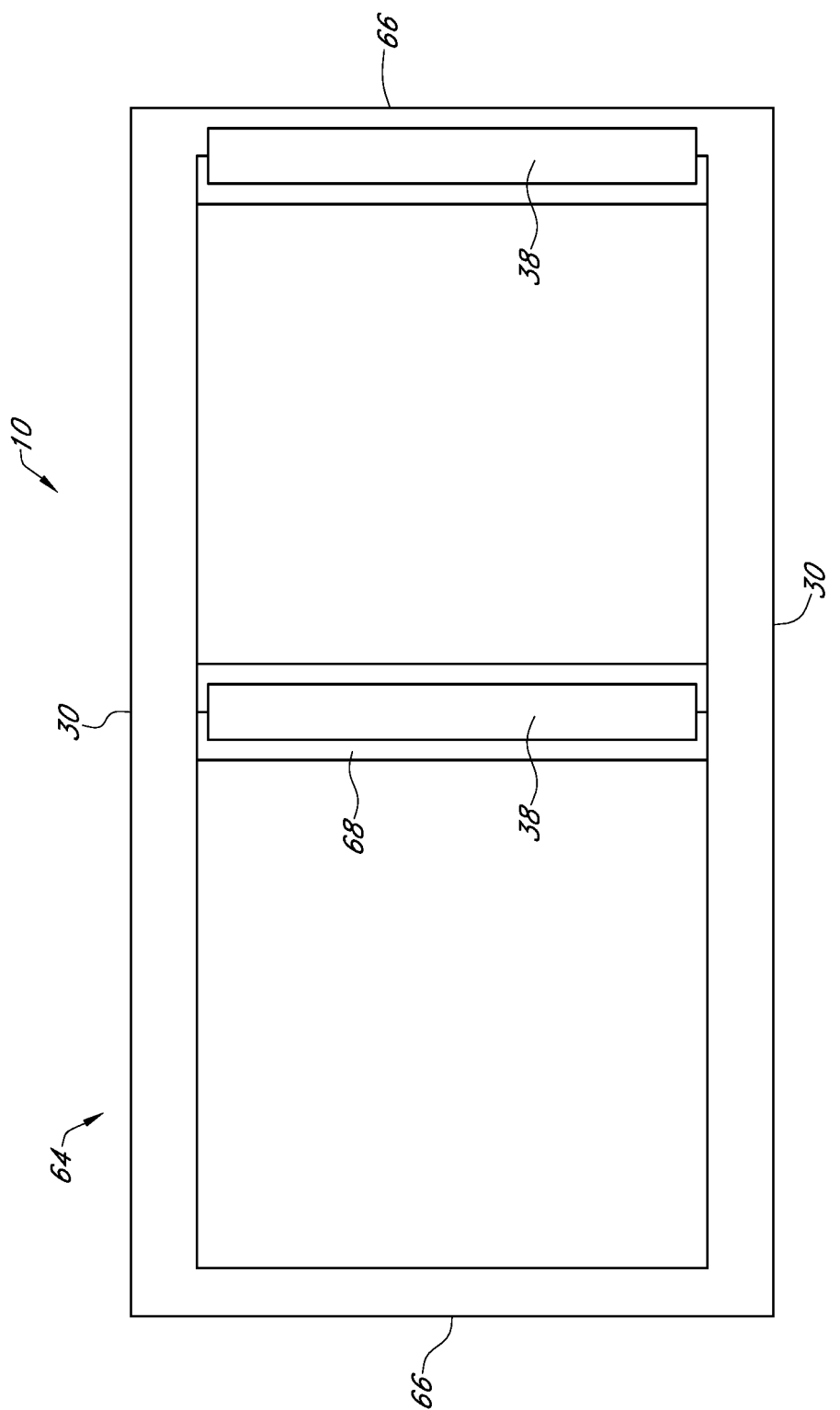
FIG. 6 is a top plan view of a vehicle top cover assembly.
Figure 7:
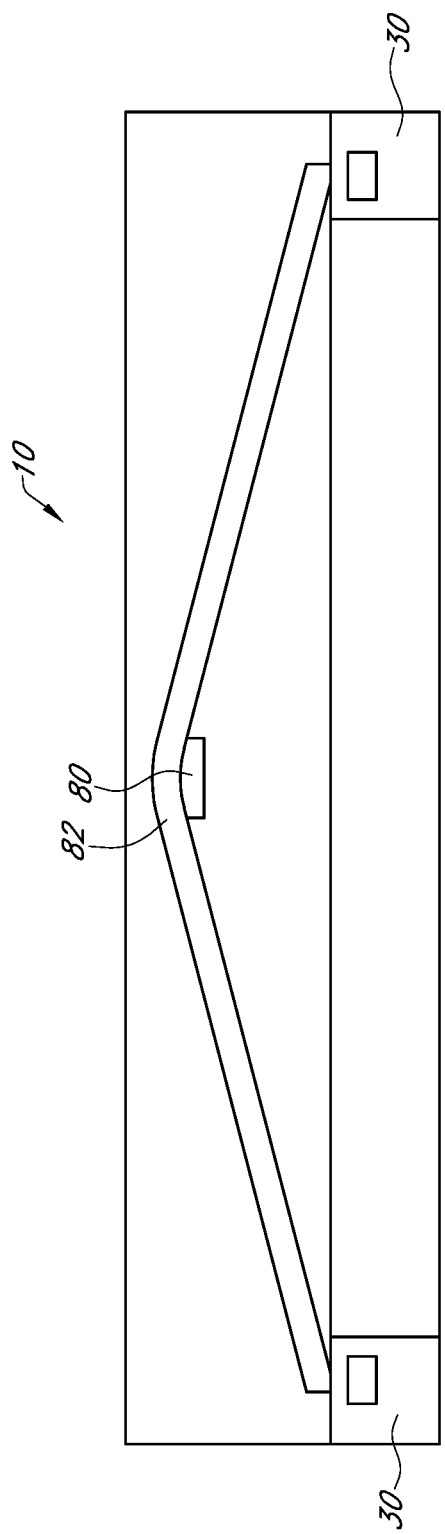
FIG. 7 is an end sectional view of a vehicle top cover assembly.

Referring to the figures, a vehicle top assembly 10 is used in relation to a convertible vehicle 12 having roll bars 14 that extend upwardly from a vehicle body 16. More specifically is a forward or first roll bar 14A that has a transverse section 18 that extends across the body 16 and is adjacent to the vehicle's windshield 20 and a pair of support sections 22 that extend downwardly and are connected to the body 16. A pair of second or rearward roll bars 14B extend rearwardly and transversely from the first roll bar 14A and have a longitudinal section 24 that is in spaced parallel relation to a side 26 of the body 16 and terminates in a pair of vertical support sections 28 connected to the side 26 of the body 16.

The cover assembly 10 is mounted to the transverse section 18 of roll bar 14A and longitudinal sections 24 of roll bars 14B. The cover assembly 10 includes a forward transverse housing 29 and a pair of rails 30 that extend rearwardly and perpendicularly to the housing 29. The cover assembly 10 is mounted to the roll bars 14 in any manner by a fastening member 32, such as a strap, a clamp, a lock or the like, and/or a groove 34 in the bottom of the housing 29 and the rails 30 that are formed to receive the transverse 18 and longitudinal sections 24 of the roll bars 14.

Rotatably mounted within the housing 29 is a roller 38 that is either spring loaded or attached to a crank 40 outside of the housing 29. Attached at a first end 42 to the roller 38 is a layer of material 44. The layer of material 44 is of any type including, but not limited to, moisture resistant fabric, clear pliable plastic, or slats extending between wires. At the opposite end 46 of the layer of material is a handle 48. Attached to the side edges 50 of the layer of material is one or more locking members 52, such as a pin or the like.

Positioned along the rails 30 is one or more locking slots 54. The locking slots 54 are of any size, shape, and structure and, in one example, provide an opening on a top 56 of the rails 30 that extend to an outer edge or side 58 of the rail 30. Attached to the outer side 58 is a locking catch 60 positioned to selectively engage and lock in place the locking member 52. Alternatively, the slot is formed to have a catch section 62 that selectively holds the locking member 52 in place.

In operation, the cover assembly 10 is mounted to the roll bars 14 using fastening members 32 and/or grooves 34 in the bottom of the cover assembly 10. Once mounted, the layer of material 44, using handle 48 is pulled along the rails 30, away from roller 38 to cover the body 16 of the vehicle 12. To hold the layer of material 44 in place, locking members 52 are received within locking slots 54 and are retained by the locking catch 60 and/or catch section 62.

To retract the layer of material 44, the locking members 52 are manually removed from catch member 60 and/or catch section 62. The layer of material 44 automatically retracts if the roller 38 is spring loaded. Alternatively, the layer of material 44 is retracted by manually turning crank 40.

In an alternative embodiment the cover assembly 10 has a frame 64 that includes a pair of rails 30 and at least one and preferably two transverse end members 66. The frame 64 is connected to the vehicle 12 in a similar manner to what was previously described. Extending between the side rails 30 is a center section 68 positioned between the end members 66.

Disposed within the center section 68 is at least one and possibly two rollers 38. Attached to the rollers 38 at a first end 42 is a layer of material 44 and attached to the second end 46 is a handle 48 or a connecting member 70. One layer 44 extends from the center section 68 and connects to the windshield 20, windshield handle (not shown), or a clip 72 on an end member 66 attached to the windshield 20. A second layer 44 extends from the center section 68 and connects to a clip 72 on an end member 66 adjacent the rear of the vehicle 12. Alternatively, a roller 38 is disposed in one or both of the end members 66 and the layer of material extends from the end members 66 and is connected to a clip 72 at the center section 68.

The layer of material 44 is slidably connected to the side rails 30 as previously described. Alternatively, attached to a side edge 50 of the layer of material 44 is a slidable member 74 that fits within a groove 76 in the side or top of the rails 30. The slidable member is of any shape, size, and structure such as a block, roller, wheel, or the like. The groove 76 is elongated and straight or alternatively has a wave like or serpentine shape which permits water to drain toward the side rails 30 and exit through a drainage opening such as holes or slits 78. The layer of material 44 may also have a flexible support 80. The flexible support 80, similar to a tape measure, extends from the first end 42 to the second end 46 of the layer of material 44 and is preferably centrally located. The flexible support 80 creates a peak or an apex 82 that causes water to drain toward the drainage opening 78.

Finally, side panels 84, and a rear panel 86 are adapted to connect to the frame 64 and the vehicle body 16 to provide an enclosure adjacent the rear of the vehicle 12. Preferably, the panels 86 have a window section 88.

Therefore, a cover assembly 10 has been provided that is simple in construction and has few parts, is inexpensive to produce, is easy to attach, operate, and remove, and improves upon the art. From the above discussion and accompanying figures and claims it will be appreciated that the cover assembly 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A vehicle top cover assembly, comprising:
    a frame having a pair of side rails and at least one end member connected to a vehicle;
    a center section extending between the side rails having at least one roller disposed within the center section;
    a layer of material connected at a first end to the roller;
    wherein the layer of material has a slidable member attached to a side edge of the layer of material and is slidably received within a groove on the side rails; and
    wherein the groove has a wave-like shape adapted to assist in draining water toward a drainage opening in the side rail.

2. The cover assembly of claim 1 wherein the layer of material is connected to an end member at a second end of the layer of material.

3. The cover assembly of claim 1 wherein the layer of material is connected to a windshield of the vehicle at a second end of the layer of material.

4. The cover assembly of claim 1 wherein two rollers are disposed within the center section.

5. The cover assembly of claim 1 further comprising a pair of side panels and a rear panel connected to the frame and the vehicle.

6. The cover assembly of claim 1 further comprising the layer of material having a flexible support extending from a first end to a second end of the layer of material.

7. A vehicle top cover assembly, comprising:
    a frame having a pair of side rails and at least one end member connected to a vehicle, wherein the pair of side rails have at least one drainage opening;
    a groove on the side rails has a wave-like shape adapted to assist in draining water toward the at least one drainage opening;
    a center section extending between the side rails having at least one roller disposed within the center section; and
    a layer of material connected at a first end to the roller.

\* \* \* \* \*